United States Patent
Richardson

(10) Patent No.: US 6,212,895 B1
(45) Date of Patent: Apr. 10, 2001

(54) MACHINERY COOLING SYSTEM

(75) Inventor: Curt D Richardson, Lake City, IA (US)

(73) Assignee: Emmpak Foods Inc., Butler, WI (US)

( * ) Notice: Subject to any disclaimer, the term of this patent is extended or adjusted under 35 U.S.C. 154(b) by 0 days.

(21) Appl. No.: 09/443,604

(22) Filed: Nov. 19, 1999

(51) Int. Cl.[7] ....................................... F25D 17/02
(52) U.S. Cl. ................................. 62/185; 62/434
(58) Field of Search ........................ 62/185, 430, 434, 62/62

(56) References Cited

U.S. PATENT DOCUMENTS

| | | |
|---|---|---|
| 1,800,833 | 4/1931 | Huff . |
| 2,468,489 | 4/1949 | D'Arcey . |
| 3,220,470 | 11/1965 | Balch . |
| 3,690,410 | 9/1972 | Sieghartner . |
| 3,805,880 | 4/1974 | Lawlar . |
| 4,095,644 | 6/1978 | Huff . |
| 4,220,015 | 9/1980 | Johansing, Jr. . |
| 4,368,775 | 1/1983 | Ward . |
| 4,458,747 | 7/1984 | Berry et al. . |
| 5,022,494 | 6/1991 | Yamakage et al. . |
| 5,197,537 | 3/1993 | Chigira et al. . |
| 5,318,151 | 6/1994 | Hood et al. . |
| 5,727,393 | * 3/1998 | Mahmoudzadeh ............ 62/185 X |
| 5,966,954 | * 10/1999 | Arima et al. .................... 62/185 |

* cited by examiner

*Primary Examiner*—Corrine McDermott
*Assistant Examiner*—Chen-Wen Jiang
(74) *Attorney, Agent, or Firm*—Lathrop & Clark LLP

(57) ABSTRACT

A cooling system has an ethylene glycol coolant transport loop which is cooled by the existing plant ammonia based refrigeration system. The coolant loop employs ethylene glycol to transport heat between an ammonia evaporator and the hydraulic systems of individual machines. The ethylene glycol coolant is supplied from a supply header which is connected to a return side header by individual cooling loops which pass through the heat exchangers mounted on individual machines for cooling the machine hydraulic fluid. The supply header is also connected to the return header by a regulating valve set to maintain a constant pressure drop between the supply header and the return header. Each machine coolant fluid flow can be adjusted by a regulating valve which is adjusted by reference to a flow meter on a particular coolant loop. As each individual coolant loop is adjusted, the regulating valve between the supply header and the return header will require adjusting either automatically or manually to maintain a constant pressure drop between the supply header and the return header.

12 Claims, 1 Drawing Sheet

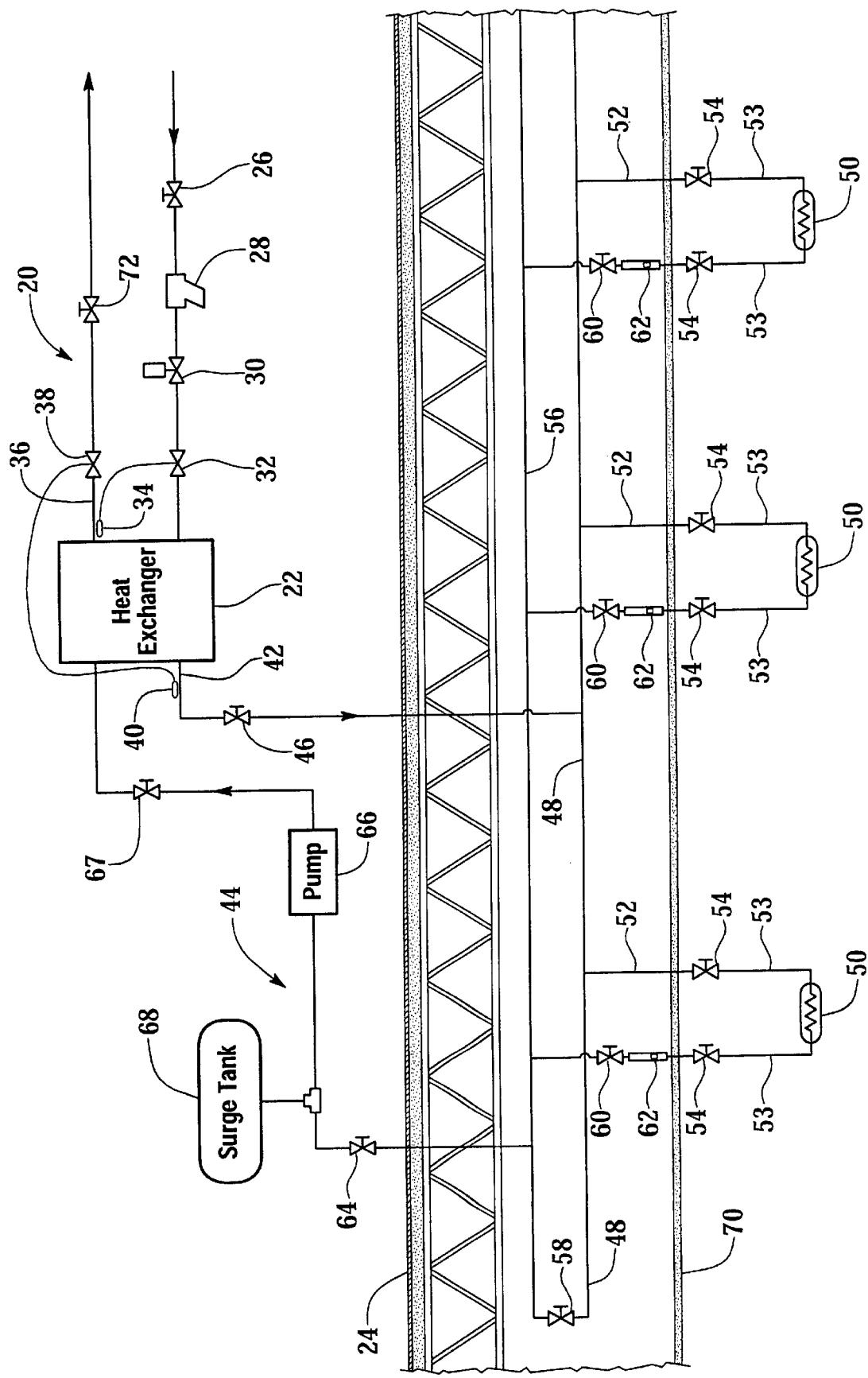

MACHINERY COOLING SYSTEM

CROSS REFERENCES TO RELATED APPLICATIONS

STATEMENT AS TO RIGHTS TO INVENTIONS MADE UNDER FEDERALLY SPONSORED RESEARCH AND DEVELOPMENT

BACKGROUND OF THE INVENTION

The present invention relates to refrigeration systems in general, and more particularly to refrigeration systems which provide cooling for air as well as machinery fluids.

Many industrial processes require control of the temperature of the material being processed and often of the machines handling the material. Particularly in the food industry an entire plant may be cooled to prevent spoilage and the growth of bacteria in foodstuffs. This is particularly a concern with meat, where it is important to control bacterial growth to assure product safety.

In an industrial setting, ammonia is often employed as a refrigerant. Ammonia is low cost and an efficient refrigerant for the temperature range of interest in many industrial processes. The hazards associated with ammonia: flammability and toxicity if inhaled, are safely handled in an industrial setting where safety practices and monitoring equipment can be reliably employed. Thus, for industrial processes, ammonia is one of the most widely used refrigerants.

Ethylene glycol is a widely used coolant. When used alone or mixed with water it has excellent heat absorbing characteristics, good thermal conductivity, and remains liquid over a broad temperature band. Whereas ammonia is used in a refrigerator or heat pump to transport heat energy from a cool reservoir to a warm reservoir, ethylene glycol transports heat from a warm reservoir to a cool reservoir.

In industrial plants, merely keeping the air at a desired temperature will not typically ensure that a material being handled within the plant remains near the air temperature. Machines which perform work convert energy stored as hydraulic pressure into mechanical motion. Most of the energy, however, is eventually converted into heat. Where a material is worked by a machine, the machine and the material may become undesirably heated. For machines employing hydraulic fluid to transfer energy, a typical process is to cool the hydraulic oil used by individual machines by passing water through a heat exchanger so that heat from the oil is given up to the cooling water.

Ground water is sometimes used as a low cost source of cooling fluid to extract heat from hydraulic oil. Water has a high specific heat and when pumped from below the ground typically has a temperature, determined principally by latitude, which in the Midwest is typically in the neighborhood of 55 degrees Fahrenheit. In the past this ground water could be obtained at the cost of pumping it from the ground.

Modern industrial plants, particularly those handling organic material, are typically connected to their own or to a municipal sewage treatment plant. Particularly when connected to a municipal sewage treatment plant, the cost of treatment is based on the amount of water consumed. Thus the use of an open loop water cooling system can have considerable negative economic consequences.

What is needed is an efficient method and apparatus for closed loop cooling of machine hydraulic fluids.

SUMMARY OF THE INVENTION

The cooling system of this invention employs an ethylene glycol coolant transport loop which is cooled by the existing plant ammonia-based air conditioning or other refrigeration system. The coolant loop, which employs an ethylene glycol or a water ethylene glycol solution, moves through an ammonia evaporator where the coolant is lowered to a set point temperature, typically around 50 degrees Fahrenheit. The coolant then flows to a supply header. The supply header is connected to a return side header by one or more individual cooling loops which pass through one or more associated heat exchangers mounted on individual machines for cooling the hydraulic fluid employed by each machine. The supply header is also connected to the return header by a regulating valve which is set to maintain a constant pressure drop between the supply header and the return header. Fluid flow networks such as those involved in cooling many different machines in parallel are not subject to analytical solution, with the result that a change in one loop of a network changes flows in all other loops of the same network.

This problem is solved by maintaining a fixed pressure drop between the supply header and the return header. Thus each machine coolant fluid flow can be adjusted by a regulating valve which is adjusted by reference to a flow meter on a particular coolant loop. As each individual coolant loop is adjusted, the regulating valve between the supply header and the return header will require adjusting either automatically or manually to maintain a constant pressure drop between the supply header and the return header. However, every other coolant loop maintains a constant flow so long as the pressure drop between the supply header and the return header remains constant. This allows simple machine by machine adjustment of coolant flows. The return header is connected through an isolation valve to a surge tank and to a pump which returns the fluid to the ammonia heat exchangers where the ethylene glycol coolant is again cooled and sent to the supply header.

It is an object of the present invention to provide a lower cost method of cooling industrial machinery.

It is a further object of the present invention to provide a method of regulating the cooling of a plurality of machines without introducing ammonia into the factory floor.

It is a still further object of the present invention to eliminate open loop cooling within a manufacturing facility handling foodstuffs.

Further objects, features and advantages of the invention will be apparent from the following detailed description when taken in conjunction with the accompanying drawings.

BRIEF DESCRIPTION OF THE DRAWINGS

The FIGURE is a schematic view of the machinery cooling system of this invention.

DESCRIPTION OF THE PREFERRED EMBODIMENTS

Referring more particularly to the FIGURE, wherein like numbers refer to similar parts, an ammonia cooling loop 20 which passes through a plate and frame heat exchanger 22 is shown. The heat exchanger 22 is an Alfa Laval M6-MWFDR model available from Alfa Laval. The ammonia cooling loop 20 includes a compressor (not shown) followed by a heat exchanger (not shown) which are typically mounted on a factory roof 24 where atmospheric air is used to remove heat and condense the ammonia.

As is well understood in the art of refrigeration, a refrigerant such as ammonia, which has a low boiling point temperature and a large heat of evaporation, is allowed to absorb heat in a heat exchanger by being allowed to boil at a low pressure. A compressor, by raising the pressure of the refrigerant vapor, allows the vapor to be condensed at a higher temperature.

Thus ammonia returning from the high temperature heat exchangers (not shown), passes through an isolation valve 26, a strainer 28, a RS S8F one-half inch solenoid valve 30, and a Sporlan DEA 15L one-half inch thermal/expansion valve 32. The expansion valve 32 controls the rate at which ammonia flows into the heat exchanger 22 and the valve position is controlled by a temperature sensor 34 on the compressor side 36 of the ammonia loop 20 upstream of a RS A4AT one and one-quarter inch suction regulating valve 38.

The suction regulating valve 38 is controlled by a temperature sensor 40 positioned on the output side 42 of an ethylene glycol cooling loop 44 which passes through the heat exchanger 20 and is cooled by the evaporating ammonia. The suction regulating valve 38 controls the pressure at which ammonia is caused to boil in the heat exchanger 22. The valve 38 is typically set to maintain the ethylene glycol at 50 degrees Fahrenheit as it leaves the heat exchanger 20. The valve 38 may require factory porting for the smaller load of a particular system.

The ammonia cooling loop 20 will typically be part of a larger cooling system with the ammonia compressor drawing ammonia vapor from a number of low temperature ammonia evaporators/heat exchangers, and the condenser/high temperature heat exchanger supplying liquid ammonia to those same ammonia evaporators. Thus in a typical meat processing facility the majority of the refrigeration capability will be used to chill factory air, and provide refrigeration for freezing and storing product.

Ammonia because of its toxicity and flammability requires a process safety management program tailored to deal with the particular hazards associated with ammonia. Typically cost is minimized and safety maximized by isolating ammonia within selected portions of a factory where heightened safety management to respond specifically to the hazards of ammonia are installed. Other portions of the factory which are isolated from the ammonia handling equipment can thus be more cost effectively designed and maintained. Typically ammonia will be limited to a heat exchanger located on the roof of a factory and within the factory engine room where the ammonia compressor may be located.

The ethylene glycol loop 44, after leaving the ammonia heat exchanger 22, passes through an isolation valve 46 to a one and one-half inch copper tubing header 48. Ethylene glycol from the header 48 is then supplied to heat exchangers 50 through which the hydraulic oil in individual machines is cooled. Typical machines where this type of cooling is necessary are FORMAX pattie forming machines such as are available from Formax, Inc. of Mokena, Ill. The cooling ethylene glycol loop system described herein is sized for a facility employing seven F-26 FORMAX pattie forming machines, but could be sized for any number of machines.

Ethylene glycol coolant is supplied to the heat exchangers 50 through one-half inch copper supply lines 52 which drop through the factory floor false ceiling 70 and are connected by flexible hoses 53 to the heat exchanger 50. Each coolant loop through a machine heat exchanger 50 employs two isolation valves 54 so a particular machine can be isolated from the coolant supply header 48 and return header 56. Such isolation is useful when a machine is installed, removed, or shut down.

The return header 56 is also fabricated of one and one-half inch copper pipe. Resistance to fluid flow scales as the fourth power of pipe diameter, so that headers 48, 56 (which are three times the diameter of the supply lines 52 to individual machines) have insignificant pressure drops by comparison to the pressure drop in the supply lines 52.

A regulation valve 58 connects the supply header 48 directly to the return header 56 for the purpose of maintaining a constant pressure drop between the supply header 48 and the return header 56. Where the total pressure drop for the system of the FIGURE is approximately 42 psi, the pressure drop between the supply header and the return header constitutes a substantial portion of the total pressure drop. To maintain a constant pressure drop the regulation valve 58 must be self-adjusting or adjustable in response to a controller so as to maintain the pressure drop across the valve 58. The effect of the regulation valve 58 is to make the coolant flow through supply lines 52 to individual machine heat exchangers 50 essentially independent of the coolant flow through every other heat exchanger 50.

Without the regulating valve 58 between the supply header 48 and the return header 56, a change in the flow of cooling through a single machine heat exchanger 50 would require the iterative adjustment of all flow valves in the coolant circuit. With the employment of the regulating valve 58 between the supply header 48 and the return header 56, the flow through the supply lines 52 to each machine heat exchanger 50 can be simply adjusted by adjusting a single regulation valve 60 based on a sensor such as a flow meter 62 responsive to the fluid flow through a particular set of supply lines 52.

The return header 56 is connected through an isolation valve 64 to a pump 66 and a surge and expansion tank 68. The surge tank serves to minimize pressure spikes in the ethylene glycol coolant loop 44 and to adjust coolant supply as machines are added or removed from the coolant loop 44 and absorb expansion of the cooling solution when the system is shut down and fluid volume increases due to temperature increase of the ethylene glycol. For the system described, a 30 gallon expansion tank is sufficient. From the pump 66 the ethylene glycol coolant flows through a check valve 67 to the heat exchanger 22.

The pump 66 is sized to meet the requirements set by the number of machines cooled and the total resistance to fluid flow of the various fluid loops. A pump from the Goulds Series 3642, of two horsepower which supplies 40 gallons per minute at a pressure equivalent to a head of ninety feet is employed in the coolant loop 44. Such a pump is available from Goulds Pumps, Incorporated (Seneca Falls, N.Y.).

When the system is within the range of maximum cooling capability it is self-adjusting. As machines transfer heat to the cooling ethylene glycol, the temperature of the ethylene glycol flowing into the heat exchanger 22 increases. The output temperature is regulated to 50° F. by opening the suction valve 38 to increase the rate at which ammonia is evaporated in the heat exchanger 22. Opening the suction valve 38 allows more ammonia to be evaporated, removing more heat from the ethylene glycol. If insufficient ammonia is supplied to the heat exchanger 22, the temperature of the ammonia vapor leaving the heat exchanger 22 increases, which causes the expansion valve 32 to increase the flow of ammonia to the heat exchanger 22.

An isolation valve 72 is positioned between the suction valve 38 and the ammonia compressor (not shown).

It should be understood that expansion valves, suction valves, solenoid shut off valves, and isolation valves can be obtained from companies such as Porlan Valve Company (St. Louis, Mo.).

It should be understood that ammonia is a refrigerant, other widely used refrigerants include hydrocarbons and fluorocarbons and compounds containing chlorine, fluorine, carbon and hydrogen, the particular compounds being well known to those skilled in the art. Similarly coolant fluids other than those which are comprised of solutions of ethylene glycol and water are known to those skilled in the art.

It is understood that the invention is not limited to the particular construction and arrangement of parts herein illustrated and described, but embraces all such modified forms thereof as come within the scope of the following claims.

What is claimed is:

1. A closed loop cooling system for cooling meat handling machines, comprising:
   a factory having a portion designed to accommodate refrigerant handling equipment and a portion isolated from refrigerant handling equipment;
   a first heat exchanger located in the portion of the factory designed to accommodate refrigerant handling equipment, the heat exchanger having liquid refrigerant on a first side and a coolant fluid for transporting heat energy on a second side;
   a coolant loop which circulates the coolant fluid to a coolant supply header located in the portion of the factory isolated from refrigerant handling equipment, the coolant supply header having a first selected diameter;
   a coolant return header having a second selected diameter, connected to a surge tank and a pump, the pump supplying the coolant fluid to the second side of the heat exchanger;
   a plurality of individual machine cooling loops, each machine cooling loop passing through a heat exchanger mounted on an individual machine for cooling the hydraulic fluid employed by each said machine;
   each individual machine cooling loop having a flow meter and a regulating valve for adjustment of the flow of the coolant fluid therethrough,
   wherein the refrigerant is ammonia and the coolant fluid is a solution of ethylene glycol and water,
   wherein the first heat exchanger, the pump and the surge tank are located on a roof of the factory which is part of the portion of the factory designed to accommodate ammonia handling equipment, and wherein the coolant supply header and the coolant return header are positioned between the roof of the building and a false ceiling within the portion of the factory isolated from ammonia handling equipment.

2. A closed loop cooling system for cooling meat handling machines, comprising:
   a factory having a portion designed to accommodate refrigerant handling equipment and a portion isolated from refrigerant handling equipment;
   a first heat exchanger located in the portion of the factory designed to accommodate refrigerant handling equipment, the heat exchanger having liquid refrigerant on a first side and a coolant fluid for transporting heat energy on a second side;
   a coolant loop which circulates the coolant fluid to a coolant supply header located in the portion of the factory isolated from refrigerant handling equipment, the coolant supply header having a first selected diameter;
   a coolant return header having a second selected diameter, connected to a surge tank and a pump, the pump supplying the coolant fluid to the second side of the heat exchanger;
   a plurality of individual machine cooling loops, each machine cooling loop passing through a heat exchanger mounted on an individual machine for cooling the hydraulic fluid employed by each said machine;
   each individual machine cooling loop having a flow meter and a regulating valve for adjustment of the flow of the coolant fluid therethrough, wherein each coolant loop comprises a pipe of a third diameter, and wherein the coolant supply header first diameter is approximately three times the third diameter, and wherein the coolant return header second diameter is approximately equal to the first diameter.

3. A closed loop cooling system for cooling meat handling machines, comprising:
   a factory having a portion designed to accommodate refrigerant handling equipment and a portion isolated from refrigerant handling equipment;
   a first heat exchanger located in the portion of the factory designed to accommodate refrigerant handling equipment, the heat exchanger having liquid refrigerant on a first side and a coolant fluid for transporting heat energy on a second side;
   a coolant loop which circulates the coolant fluid to a coolant supply header located in the portion of the factory isolated from refrigerant handling equipment, the coolant supply header having a first selected diameter;
   a coolant return header having a second selected diameter, connected to a surge tank and a pump, the pump supplying the coolant fluid to the second side of the heat exchanger;
   a plurality of individual machine cooling loops, each machine cooling loop passing through a heat exchanger mounted on an individual machine for cooling the hydraulic fluid employed by each said machine;
   each individual machine cooling loop having a flow meter and a regulating valve for adjustment of the flow of the coolant fluid therethrough, wherein a means for maintaining a constant pressure drop is connected between the supply header and the return header.

4. A cooling system which employs an ethylene glycol coolant transport loop which is cooled by the existing plant ammonia-based refrigeration system, comprising:
   a heat exchanger having liquid ammonia on a first side and a solution containing ethylene glycol on a second side;
   a coolant loop which circulates the solution containing ethylene glycol to a coolant supply header, the coolant supply header having a first selected diameter;
   a coolant return header having a second selected diameter, connected to a surge tank and a pump, the pump supplying the solution containing ethylene glycol to the second side of the heat exchanger;
   a plurality of individual machine cooling loops, each machine cooling loop passing through a heat exchanger mounted on an individual machine for cooling the hydraulic fluid employed by each said machine;
   each individual machine cooling loop having a flow meter and a regulating valve for adjustment of the flow of the solution containing ethylene glycol therethrough;
   a valve connected between the coolant supply header and the coolant return header for maintaining a constant pressure drop between the supply header and the return header.

5. The apparatus of claim 4 wherein the individual machines are of the type used to manufacture patties of meat.

6. The apparatus of claim 4 wherein the heat exchanger having liquid ammonia on a first side and a solution containing ethylene glycol on a second side, the pump and the surge tank are located on the roof of a building, and wherein the coolant supply header and the coolant return header are positioned between the roof of the building and a false ceiling positioned over the plurality of machines.

7. The apparatus of claim 4 wherein each coolant loop comprises a pipe of a third diameter, and wherein the coolant supply header first diameter is approximately three times the third diameter, and wherein the coolant return header second diameter is approximately equal to the first diameter.

8. The apparatus of claim 4 wherein the valve between the supply header and the return header is automatically regulated to maintain a constant pressure drop.

9. A cooling system which employs an ethylene glycol coolant transport loop which is cooled by the existing plant ammonia-based refrigeration system, comprising:

a heat exchanger having liquid ammonia on a first side and a solution containing ethylene glycol on a second side;

a coolant loop which circulates the solution containing ethylene glycol to a coolant supply header, the coolant supply header having a first selected diameter;

a coolant return header having a second selected diameter, connected to a surge tank and a pump, the pump supplying the solution containing ethylene glycol to the second side of the heat exchanger;

a plurality of individual machine cooling loops, each machine cooling loop passing through a heat exchanger mounted on an individual machine for cooling the hydraulic fluid employed by each said machine;

each individual machine cooling loop having a flow meter and a regulating valve for adjustment of the flow of the solution containing ethylene glycol therethrough;

a self-adjusting valve connected between the coolant supply header and the coolant return header which maintains a constant pressure drop between the coolant supply header and the coolant return header.

10. The apparatus of claim 9 wherein the individual machines are of the type used to manufacture patties of meat.

11. The apparatus of claim 9 wherein the heat exchanger having liquid ammonia on a first side and a solution containing ethylene glycol on a second side, the pump and the surge tank are located on the roof of a building, and wherein the coolant supply header and the coolant return header are positioned between the roof of the building and a false ceiling positioned over the plurality of machines.

12. The apparatus of claim 9 wherein each coolant loop comprises a pipe of a third diameter, and wherein the coolant supply header first diameter is approximately three times the third diameter, and wherein the coolant return header second diameter is approximately equal to the first diameter.

* * * * *